US012063731B2

(12) United States Patent
Baldo et al.

(10) Patent No.: US 12,063,731 B2
(45) Date of Patent: Aug. 13, 2024

(54) SYSTEM AND METHOD FOR TUNING AN INDUCTION CIRCUIT

(71) Applicant: WHIRLPOOL CORPORATION, Benton Harbor, MI (US)

(72) Inventors: Salvatore Baldo, Grott (IT); Stefano Moroni, Laveno Mombello (IT); Davide Parachini, Cassano Magnago (IT); Cristiano Vito Pastore, Camerio (IT); Gioacchino Prestigiacomo, Palermo (IT)

(73) Assignee: Whirlpool Corporation, Benton Harbor, MI (US)

( * ) Notice: Subject to any disclaimer, the term of this patent is extended or adjusted under 35 U.S.C. 154(b) by 533 days.

(21) Appl. No.: 17/188,036

(22) Filed: Mar. 1, 2021

(65) Prior Publication Data

US 2021/0185774 A1 Jun. 17, 2021

Related U.S. Application Data

(62) Division of application No. 15/790,414, filed on Oct. 23, 2017, now Pat. No. 10,993,292.

(51) Int. Cl.
*H05B 6/06* (2006.01)
*H05B 6/08* (2006.01)
*H05B 6/12* (2006.01)

(52) U.S. Cl.
CPC ............. *H05B 6/065* (2013.01); *H05B 6/062* (2013.01); *H05B 6/08* (2013.01); *H05B 6/1209* (2013.01)

(58) Field of Classification Search
CPC .......... H05B 6/062; H05B 6/065; H05B 6/08; H05B 6/1209
(Continued)

(56) References Cited

U.S. PATENT DOCUMENTS 3,475,674 A 10/1969 Porterfield et al.
3,515,938 A 6/1970 Morse
(Continued)

FOREIGN PATENT DOCUMENTS

CN 2822091 Y 9/2006
DE 7242625 U 3/1973
(Continued)

OTHER PUBLICATIONS

Sarnago et al., Multiple-Output ZCS Resonant Inverter for Multi-Coil Induction Heating Appliances, IEEE 2017, bages 2234-2238.
(Continued)

*Primary Examiner* — Jimmy Chou
(74) *Attorney, Agent, or Firm* — Price Heneveld LLP

(57) ABSTRACT

A method for controlling a heating operation of an induction cooktop includes generating a direct current (DC) power from an alternating current (AC) power source. The DC power is supplied to a first resonant inverter and a second resonant inverter via a power supply bus. A switching frequency of each of the first resonant inverter and the second resonant inverter is controlled and in response to the switching frequency supplied to a plurality of induction coils of the resonant inverters, an electromagnetic field is generated. A selective tuning operation of the first resonant inverter or the second resonant inverter includes controlling a connection of a capacitor to either the first resonant inverter or the second resonant inverter.

18 Claims, 7 Drawing Sheets

(58) Field of Classification Search
USPC .......................................................... 219/666
See application file for complete search history.

(56) References Cited

U.S. PATENT DOCUMENTS 3,761,667 A 9/1973 Walden
3,797,375 A * 3/1974 Cerola ................ F24C 15/2042 99/422
3,814,888 A 6/1974 Bowers et al.
3,820,005 A 6/1974 Steigerwald
3,842,338 A 10/1974 Walden
3,942,090 A 3/1976 Matthes et al.
4,092,510 A 5/1978 Kiuchi et al.
4,114,010 A 9/1978 Lewis
4,129,767 A 12/1978 Amagami et al.
4,149,217 A 4/1979 Tucker
4,347,424 A 8/1982 Obara
4,415,788 A * 11/1983 Field .................... H05B 6/1263 219/452.12
4,431,892 A * 2/1984 White ................... F24C 15/101 126/299 D
4,468,548 A * 8/1984 Yamaki ................. F24C 15/101 219/601
4,490,596 A * 12/1984 Hirai ...................... H05B 6/062 165/59
4,501,260 A * 2/1985 Grace ................. F24C 15/2042 126/300
4,511,781 A * 4/1985 Tucker ................... H05B 6/062 219/626
4,549,052 A * 10/1985 Simon ................... F24C 15/101 D7/367
4,551,600 A * 11/1985 Miyagawa ........... H05B 6/1263 126/299 D
4,578,553 A 3/1986 Yamashita et al.
4,644,123 A 2/1987 Kerlin
4,665,893 A * 5/1987 Miyagawa ........... H05B 6/1263 126/39 BA
4,695,770 A 9/1987 Raets
4,749,836 A 6/1988 Matsuo et al.
4,820,891 A 4/1989 Tanaka et al.
4,887,587 A * 12/1989 Deutsch .................. F24C 15/20 55/DIG. 36
4,899,028 A * 2/1990 Arai ..................... H05B 6/1263 126/299 D
5,190,026 A 3/1993 Doty
5,272,719 A * 12/1993 Cartlidge ................ H02M 7/48 373/150
5,428,207 A * 6/1995 Essig ................... H05B 6/1281 219/622
5,446,268 A * 8/1995 Chen ..................... F24C 15/101 219/623
5,640,497 A 6/1997 Woolbright
5,841,646 A 11/1998 Cornec
5,900,175 A * 5/1999 Kicherer ................ H05B 3/748 219/448.12
6,230,137 B1 5/2001 Has et al.
6,236,024 B1 * 5/2001 Gotz ..................... F24C 15/108 219/452.11
6,444,958 B1 * 9/2002 Campbell ................ H05B 3/74 219/460.1
6,466,467 B2 10/2002 Lehuede
6,600,139 B2 * 7/2003 Perschl ................... F24C 15/10 219/460.1
6,630,650 B2 * 10/2003 Bassill ................... H05B 6/062 219/626
6,660,981 B2 * 12/2003 Ogata .................... H05B 6/062 219/622
6,696,770 B2 2/2004 Nadot et al.
6,956,188 B2 * 10/2005 de Rooij .............. H05B 6/1245 219/619
7,023,246 B2 4/2006 Scollo et al.
7,049,552 B2 * 5/2006 Arntz ....................... H05B 3/74 219/452.12
7,053,678 B2 5/2006 Scollo et al.
7,135,661 B2 * 11/2006 Park ..................... H05B 6/1263 219/677
7,361,870 B2 4/2008 Cornec et al.
7,369,421 B1 5/2008 Chan et al.
7,402,781 B2 * 7/2008 Kondo ................ H05B 6/1218 219/622
7,429,021 B2 9/2008 Sather et al.
7,504,607 B2 3/2009 Barragan Perez et al.
7,910,865 B2 3/2011 Haag et al.
8,003,924 B2 * 8/2011 Kim ...................... F24C 15/101 219/677
8,248,145 B2 8/2012 Melanson
8,324,541 B2 12/2012 Shirokawa et al.
8,356,367 B2 1/2013 Flynn
8,658,950 B2 2/2014 Cho et al.
8,692,169 B2 * 4/2014 Lin ....................... F24C 15/101 219/622
8,872,077 B2 * 10/2014 Gagas ................. F24C 15/2042 219/622
8,884,197 B2 * 11/2014 Gagas .................. H05B 6/1263 219/622
8,975,931 B2 3/2015 Koehler
9,019,736 B2 4/2015 Lee et al.
9,198,233 B2 11/2015 Brosnan et al.
9,226,343 B2 * 12/2015 Moon .................... H05B 6/062
9,241,374 B2 * 1/2016 Matsui ................. H05B 6/1263
9,269,133 B2 2/2016 Cho et al.
9,277,598 B2 3/2016 Lee et al.
9,295,110 B2 * 3/2016 Matsui ................. H05B 6/1263
9,326,329 B2 4/2016 Kitaizumi et al.
9,347,672 B2 5/2016 Jungbauer et al.
9,400,115 B2 7/2016 Kuwamura
9,544,948 B2 * 1/2017 Pastore ............... H02M 7/4815
9,841,196 B2 * 12/2017 Chavan ................. F24C 15/101
9,848,462 B2 * 12/2017 Lee ........................ H05B 6/062
10,251,221 B2 * 4/2019 Takahashi ............ H05B 6/1281
10,873,994 B2 * 12/2020 Nam ....................... G05F 1/153
10,993,292 B2 * 4/2021 Baldo .................... H05B 6/062
2002/0117497 A1 * 8/2002 Bassill ................... H05B 6/062 219/626
2003/0163326 A1 8/2003 Maase
2004/0149752 A1 * 8/2004 Yamaguchi .............. H05B 6/72 219/757
2005/0087526 A1 4/2005 Kim et al.
2005/0121438 A1 6/2005 Hirota et al.
2006/0049177 A1 * 3/2006 Park ..................... H05B 6/1263 219/622
2006/0072353 A1 4/2006 Mhaskar et al.
2006/0091135 A1 * 5/2006 Kondo ................ H05B 6/1218 219/621
2006/0209577 A1 9/2006 Hackner et al.
2006/0289489 A1 12/2006 Wang
2007/0131675 A1 * 6/2007 Oh ....................... H05B 6/1263 219/601
2008/0185376 A1 * 8/2008 Gagas .................. H05B 6/1263 219/623
2009/0084777 A1 4/2009 Oh et al.
2009/0272735 A1 11/2009 Suenaga et al.
2009/0314771 A1 * 12/2009 Okada .................... H05B 6/062 219/647
2009/0321424 A1 12/2009 Buñuel Magdalena et al.
2010/0181306 A1 * 7/2010 Gutierrez ................ H02M 3/01 219/660
2010/0182136 A1 7/2010 Pryor
2010/0237064 A1 * 9/2010 Liu ...................... H05B 6/1209 219/622
2011/0051473 A1 3/2011 Glaser et al.
2011/0139771 A1 6/2011 Dohmeier et al.
2011/0168697 A1 7/2011 Kazama et al.
2011/0240632 A1 * 10/2011 Anton Falcon ........ H05B 6/065 219/601
2011/0272397 A1 11/2011 Artal Lahoz et al.
2012/0037616 A1 2/2012 Kitahara et al.
2012/0152932 A1 * 6/2012 Moon .................. H05B 6/1263 219/601
2012/0152933 A1 * 6/2012 Matsui ................. H05B 6/1263 219/623

(56) References Cited

U.S. PATENT DOCUMENTS

| | | | | |
|---|---|---|---|---|
| 2012/0152935 | A1 | 6/2012 | Kitaizumi et al. | |
| 2012/0187107 | A1 | 7/2012 | Liu et al. | |
| 2012/0205365 | A1 | 8/2012 | Anton Falcon et al. | |
| 2012/0248098 | A1 | 10/2012 | Lee et al. | |
| 2013/0008889 | A1 | 1/2013 | Ogasawara et al. | |
| 2013/0043239 | A1 | 2/2013 | Anton Falcon et al. | |
| 2013/0087554 | A1* | 4/2013 | Anton Falcon | H05B 6/062 219/622 |
| 2013/0098901 | A1* | 4/2013 | Corleoni | H05B 6/02 219/620 |
| 2013/0206750 | A1 | 8/2013 | Anton Falcon et al. | |
| 2013/0240505 | A1* | 9/2013 | Moon | H05B 6/062 219/632 |
| 2013/0248517 | A1 | 9/2013 | Moon et al. | |
| 2013/0314953 | A1 | 11/2013 | Cuzner et al. | |
| 2013/0334212 | A1* | 12/2013 | Sawada | H05B 6/065 219/662 |
| 2013/0334213 | A1 | 12/2013 | Isoda et al. | |
| 2014/0014649 | A1* | 1/2014 | Chavan | F24C 15/101 219/620 |
| 2014/0049996 | A1 | 2/2014 | Ku et al. | |
| 2014/0104907 | A1* | 4/2014 | Shimada | H02M 7/493 363/80 |
| 2014/0144902 | A1 | 5/2014 | Oh et al. | |
| 2014/0151365 | A1 | 6/2014 | Oh et al. | |
| 2014/0158679 | A1 | 6/2014 | Moon et al. | |
| 2014/0177300 | A1 | 6/2014 | Lagorce et al. | |
| 2014/0183182 | A1 | 7/2014 | Oh et al. | |
| 2014/0183183 | A1* | 7/2014 | Oh | H05B 6/065 219/662 |
| 2014/0183184 | A1* | 7/2014 | Oh | H05B 6/065 219/662 |
| 2015/0028022 | A1* | 1/2015 | Moon | H05B 6/1263 219/622 |
| 2015/0108118 | A1* | 4/2015 | Uchida | H05B 6/104 219/671 |
| 2015/0144616 | A1* | 5/2015 | Gagas | H05B 6/1263 219/623 |
| 2015/0289321 | A1* | 10/2015 | Uchida | H05B 6/44 219/662 |
| 2016/0014849 | A1* | 1/2016 | Hegedis | G01K 1/143 219/627 |
| 2016/0029439 | A1* | 1/2016 | Kurose | H05B 6/065 219/626 |
| 2016/0037589 | A1* | 2/2016 | Altamura | F24C 15/106 219/465.1 |
| 2016/0057814 | A1 | 2/2016 | Klett et al. | |
| 2016/0065049 | A1 | 3/2016 | Wu et al. | |
| 2016/0100460 | A1* | 4/2016 | Park | H05B 6/1272 219/624 |
| 2016/0100461 | A1* | 4/2016 | Park | H05B 6/1272 219/662 |
| 2016/0323937 | A1* | 11/2016 | Anton Falcon | H05B 6/04 |
| 2016/0330799 | A1 | 11/2016 | Leyh et al. | |
| 2016/0374151 | A1* | 12/2016 | Ok | H05B 6/065 |
| 2016/0381735 | A1 | 12/2016 | Christiansen et al. | |
| 2016/0381736 | A1 | 12/2016 | Christiansen et al. | |
| 2017/0055318 | A1* | 2/2017 | Franco Gutierrez | F24C 7/062 |
| 2017/0142783 | A1 | 5/2017 | Herzog et al. | |
| 2018/0077758 | A1* | 3/2018 | Lim | A23L 5/15 |
| 2018/0077761 | A1* | 3/2018 | Takahashi | H05B 6/1281 |

FOREIGN PATENT DOCUMENTS

| | | | |
|---|---|---|---|
| DE | 3909125 | A1 | 9/1990 |
| DE | 4228076 | C1 | 8/1993 |
| DE | 102004009606 | A1 | 9/2005 |
| DE | 202009000990 | U1 | 3/2009 |
| DE | 102010028549 | A1 | 11/2010 |
| DE | 102013206340 | A1 | 10/2014 |
| EP | 1505350 | A2 | 2/2005 |
| EP | 1610590 | A1 | 12/2005 |
| EP | 0926926 | B1 | 11/2006 |
| EP | 1455453 | B1 | 9/2007 |
| EP | 2070442 | A2 | 6/2009 |
| EP | 2615376 | A1 | 7/2013 |
| EP | 2744299 | A1 | 6/2014 |
| EP | 2775785 | A1 | 9/2014 |
| EP | 2731402 | B1 | 8/2015 |
| EP | 1303168 | B1 | 3/2016 |
| EP | 2543232 | B1 | 7/2016 |
| EP | 2427032 | B1 | 12/2016 |
| EP | 2416621 | B1 | 7/2017 |
| EP | 3030042 | B1 | 8/2017 |
| EP | 3079443 | B1 | 11/2017 |
| EP | 2914059 | B1 | 12/2017 |
| ES | 2201937 | A1 | 3/2004 |
| ES | 2362523 | B1 | 8/2012 |
| FR | 2712071 | A1 | 5/1995 |
| FR | 2863039 | A1 | 6/2005 |
| FR | 2965446 | A1 | 3/2012 |
| JP | 2009099324 | A | 5/2009 |
| JP | 2009117378 | A | 5/2009 |
| JP | 2009158225 | A | 7/2009 |
| JP | 4932548 | B2 | 5/2012 |
| KR | 20170019888 | A | 2/2017 |
| WO | 199737515 | A1 | 10/1997 |
| WO | 2005069688 | A2 | 7/2005 |
| WO | 2008031714 | A1 | 3/2008 |
| WO | 2008122495 | A1 | 10/2008 |
| WO | 2009016124 | A1 | 2/2009 |
| WO | 2009049989 | A1 | 4/2009 |
| WO | 2009053279 | A1 | 4/2009 |
| WO | 2010101135 | A1 | 9/2010 |
| WO | 2011055283 | A1 | 5/2011 |
| WO | 2011128799 | A1 | 10/2011 |
| WO | 2011148289 | A2 | 12/2011 |
| WO | 2012104327 | A1 | 8/2012 |
| WO | 2014156010 | A1 | 10/2014 |
| WO | 2016010492 | A1 | 1/2016 |
| WO | 2016015971 | A1 | 2/2016 |
| WO | 2016071803 | A1 | 5/2016 |
| WO | 2016087297 | A1 | 6/2016 |
| WO | 2016134779 | A1 | 9/2016 |
| WO | 2017109609 | A1 | 6/2017 |
| WO | 2017115334 | A1 | 7/2017 |

OTHER PUBLICATIONS

Sarnago et al., Modulation Scheme for Improved Operation of an RB-IGBT-Based Resonant Inverter Applied to Domestic Induction Heating,: IEEE Transactions on Industrial Electronics, vol. 60, No. 5, May 2013, pp. 2066-2073.

* cited by examiner

SYSTEM AND METHOD FOR TUNING AN INDUCTION CIRCUIT

CROSS-REFERENCE TO RELATED APPLICATIONS

This application is a divisional application from U.S. application Ser. No. 15/790,414 entitled SYSTEM AND METHOD FOR TUNING AN INDUCTION CIRCUit, filed on Oct. 23, 2017, by Salvatore Baldo et al., now U.S. Pat. No. 10,993,292, the entire disclosure of which is incorporated herein by reference.

FIELD OF THE INVENTION

The present disclosure relates to an induction cooktop and, more particularly, to a circuit configuration and method of operation for an induction cooktop.

BACKGROUND

Induction cooktops are devices which exploit the phenomenon of induction heating for food cooking purposes. The disclosure provides for a power circuit for an induction cooktop configured to provide improved performance while maintaining an economical design. The improved performance may be provided by an increased range of operating power for induction cooktops. Accordingly, the disclosure provides for systems and methods of controlling the operating power of induction cooktops.

SUMMARY

According to one aspect of the present invention, a method for controlling a heating operation of an induction cooktop. A direct current (DC) power is generated from an alternating current (AC) power source and supplied to a first resonant inverter and a second resonant inverter via a power supply bus. A switching frequency of each of the first resonant inverter and the second resonant inverter is controlled and, in response to the switching frequency, supplied to a plurality of induction coils of the resonant inverters, such that an electromagnetic field is generated. A selective tuning operation of the first resonant inverter or the second resonant inverter includes controlling a connection of a capacitor to either the first resonant inverter or the second resonant inverter.

According to another aspect of the present invention, an induction cooking system includes a power supply bus configured to generate direct current (DC) power, a first resonant inverter, and a second resonant inverter in connection with the power supply bus. A plurality of induction coils are configured to generate an electromagnetic field in connection with the plurality of resonant inverters. At least one switch is configured to control a connection of a tuning capacitor with either the first resonant inverter or the second resonant inverter. The system further includes at least one controller configured to control a switching frequency of each of the first resonant inverter and the second resonant inverter supplied to the plurality of induction coils of the resonant inverters. The switching frequency controls the electromagnetic field. The controller is further configured to control the connection of the tuning capacitor with either the first resonant inverter or the second resonant inverter via the at least one switch.

According to yet another aspect of the present invention, a method for controlling an induction heating system is disclosed. The method includes generating a direct current (DC) power from an alternating current (AC) power source and supplying the DC power to a first resonant inverter and a second resonant inverter via a power supply bus. A switching frequency of each of the first resonant inverter and the second resonant inverter is controlled generating an electromagnetic field in response to the switching frequency supplied to a plurality of induction coils of the resonant inverters. A selective tuning operation of either the first resonant inverter or the second resonant inverter is applied by controlling a connection of a tuning capacitor to either the first resonant inverter or the second resonant inverter. The selective tuning operation includes connecting the tuning capacitor in parallel with a first dedicated capacitor of the first resonant inverter in a first configuration, and alternatively connecting the tuning capacitor in parallel with a second dedicated capacitor of the second resonant inverter in a second configuration.

These and other objects of the present disclosure may be achieved by means of a cooktop incorporating the features set out in the appended claims, which are an integral part of the present description.

BRIEF DESCRIPTION OF THE DRAWINGS

Further objects and advantages of the present disclosure may become more apparent from the following detailed description and from the annexed drawings, which are provided by way of a non-limiting example, wherein.

DETAILED DESCRIPTION OF EMBODIMENTS

Figure 1:
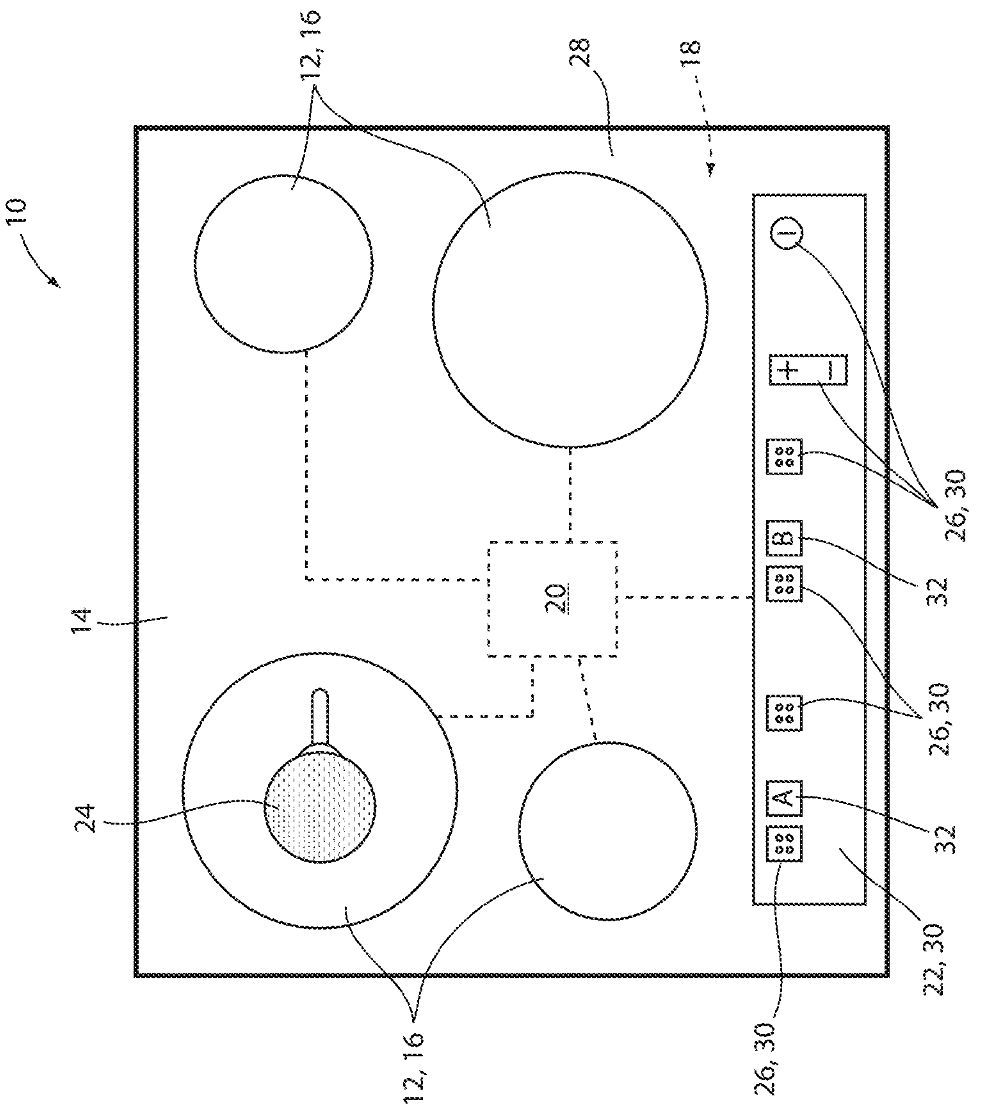
FIG. 1 is a top view of a cooktop according to the present disclosure.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Conventional induction cooktops may comprise a top surface made of glass-ceramic material upon which cooking units are positioned (hereinafter "pans"). Induction cooktops operate by generating an electromagnetic field in a cooking region on the top surface. The electromagnetic field is generated by inductors comprising coils of copper wire, which are driven by an oscillating current. The electromagnetic field has the main effect of inducing a parasitic current inside a pan positioned in the cooking region. In order to efficiently heat in response to the electromagnetic field, the pan may be made of an electrically conductive ferromagnetic material. The parasitic current circulating in the pan produces heat by dissipation; such heat is generated only within the pan and acts without directly heating the cooktop.

Induction cooktops have a better efficiency than electric cooktops (i.e. a greater fraction of the absorbed electric power is converted into heat that heats the pan). The presence of the pan on the cooktop causes the magnetic flux close to the pan itself causing the power to be transferred towards the pan. The disclosure provides for a device and method for increasing the performance of a Quasi Resonant inverter that may be used in economical induction cooktops. In particular, the methods and devices proposed increase the regulation range of AC-AC Quasi Resonant (QR) inverters arranged in couples to supply two independent induction pancake coils.

QR inverters or resonant inverters are widely used as AC current generators for induction cooktops. Such inverters, also called Single Ended inverters, are particularly attractive because they only require one solid state switch and only one resonant capacitor to generate a variable frequency/variable amplitude current to feed the induction coil. When properly designed and matched with their load, QR inverters are known to operate in a so called "soft-switching" mode of operation. The soft switching mode operates by a switching device commutating when either the voltage across it and/or the current flowing into it are null. In this sense, QR inverters may provide a reasonable compromise between cost and energy conversion efficiency.

One drawback of QR inverters is that the output power may be limited to a narrow range in the soft-switching mode of operation. In particular, when the output power being regulated falls below a given limit, the inverter fails in operating in a soft switching mode, leading to a dramatic and unmanageable increase in thermal losses and electro-magnetic interference (EMI). On the other hand, when the power being regulated exceeds a given limit, the resonating voltage across the solid state switch exceeds its maximum rating, leading to instantaneous and irreversible damage of the switching device itself. These two limitations may lead to a relatively low regulation range of the output power. The regulation range is defined as the ratio between a maximum power achievable and the minimum power achievable. The maximum power achievable is limited by a maximum voltage across the switch. The minimum power achievable is limited by a deep loss of a zero voltage switching at turn on.

The aforementioned limitations become exacerbated when multiple inverters are required to operate simultaneously and in synchronized manner. The limitations are compiled when operating two inverters because the frequency interval of allowed operation is reduced to the interval common frequency between the inverters. The common frequency interval is necessarily narrower than the individual frequency interval allowed by each of the individual QR inverters. More often than not, when the impedance of the induction coils are very different than one another, it is impossible to operate the coils simultaneously and at the same frequency without incurring severe inverter overstress. The systems and methods described herein substantially increase both the individual and the joint frequency operating regulation range of a dual QR inverter system without reducing efficiency and while preserving the soft switching operation. For clarity, the QR inverters discussed herein may be referred to as resonant inverters or inverters.

Referring to FIG. 1, a top view of a cooktop 10 is shown. The cooktop 10 may comprise a plurality of cooking hobs 12 oriented on a ceramic plate 14. Beneath the ceramic plate 14 and corresponding to each of the hobs 12, a plurality of induction coils 16 may be disposed in a housing 18. The induction coils 16 may be in communication with a controller 20 configured to selectively activate the induction coils 16 in response to an input to a user interface 22. The controller 20 may correspond to a control system configured to activate one or more of the induction coils 16 in response to an input or user selection. The induction coils 16 may each comprise a driving circuit controlled by the controller 20 that utilizes a switching device (e.g. a solid state switch) to generate a variable frequency/variable amplitude current to feed the induction coils 16. In this configuration, the induction coils 16 are driven such that an electromagnetic field is generated to heat a pan 24. Further discussion of the driving circuits of the induction coils 16 is provided in reference to FIGS. 2-4.

The user interface 22 may correspond to a touch interface configured to perform heat control and selection of the plurality of hobs 12 as represented on a cooking surface 28 of the cooktop 10. The user interface 22 may comprise a plurality of sensors 30 configured to detect a presence of an object, for example a finger of an operator, proximate thereto. The sensors 30 may correspond to any form of sensors. In an exemplary embodiment, the sensors 30 may correspond to capacitive, resistive, and/or optical sensors. In an exemplary embodiment, the sensors 30 correspond to capacitive proximity sensors.

The user interface 22 may further comprise a display 32 configured to communicate at least one function of the cooktop 10. The display 32 may correspond to various forms of displays, for example, a light emitting diode (LED) display, a liquid crystal display (LCD), etc. In some embodiments, the display 32 may correspond to a segmented display configured to depict one or more alpha-numeric characters to communicate a cooking function of the cooktop 10. The display 32 may further be operable to communicate one or more error messages or status messages of the cooktop 10.

Figure 2:
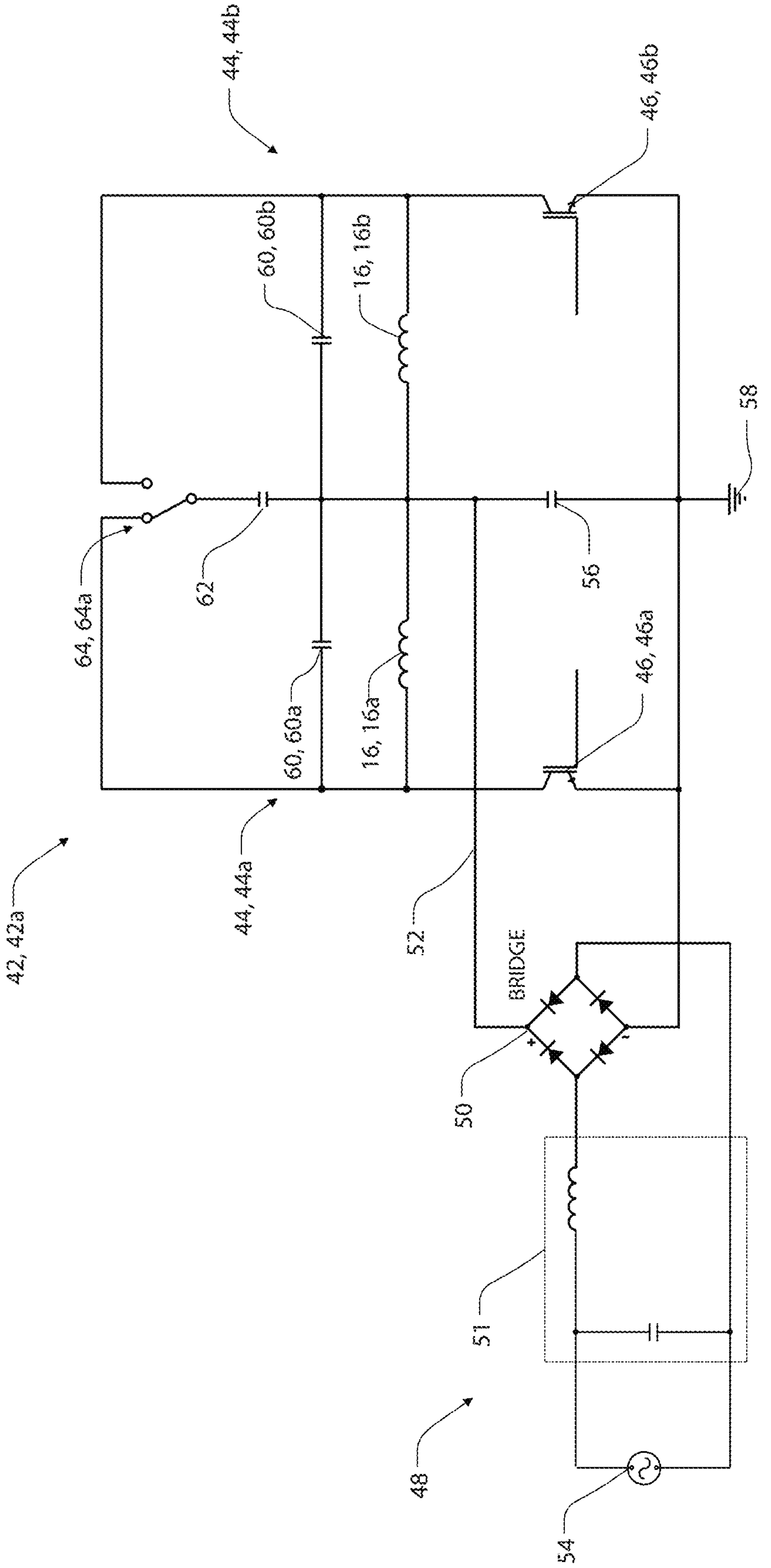
FIG. 2 is a schematic representation of an exemplary embodiment of a driving circuit for an induction cooking system.
Figure 3:
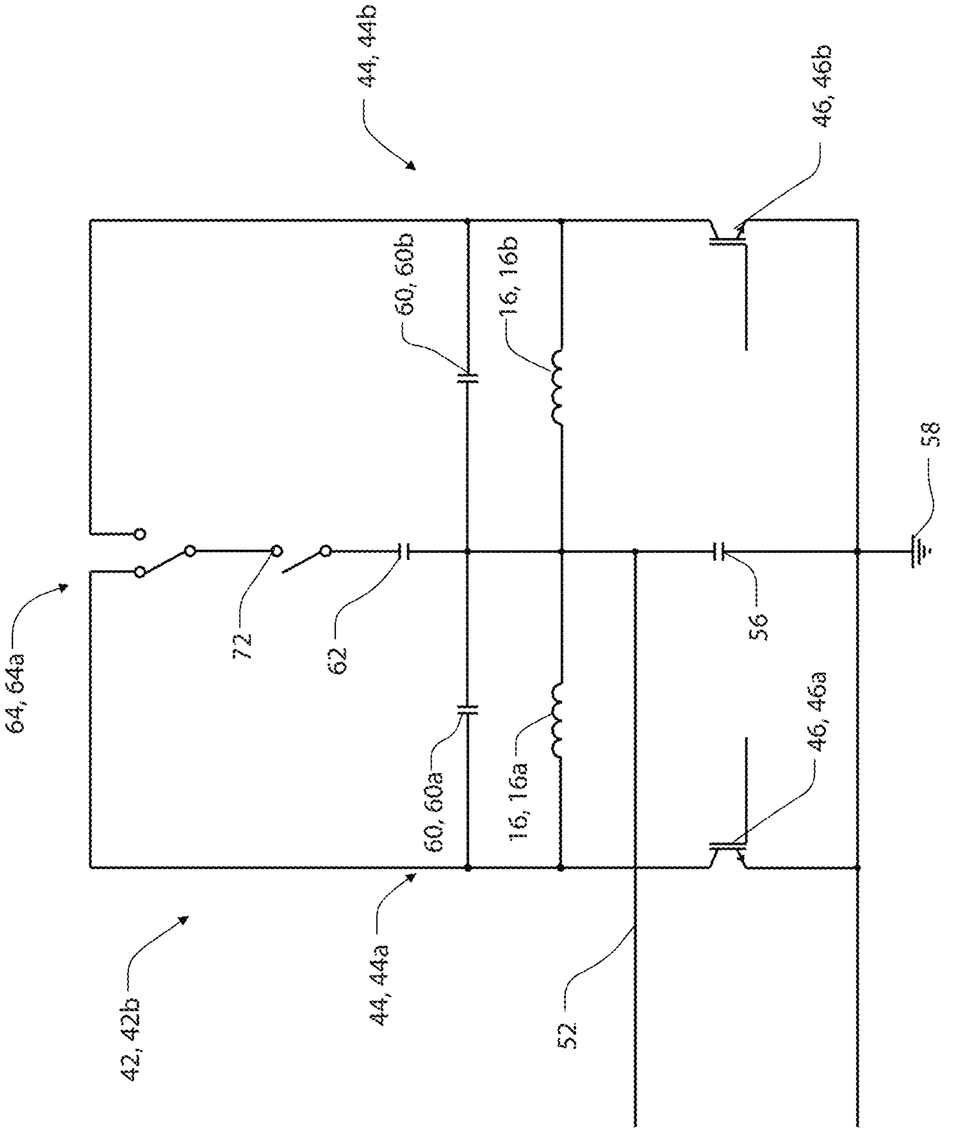
FIG. 3 is a schematic representation of an exemplary embodiment of a driving circuit for an induction cooking system.
Figure 4:
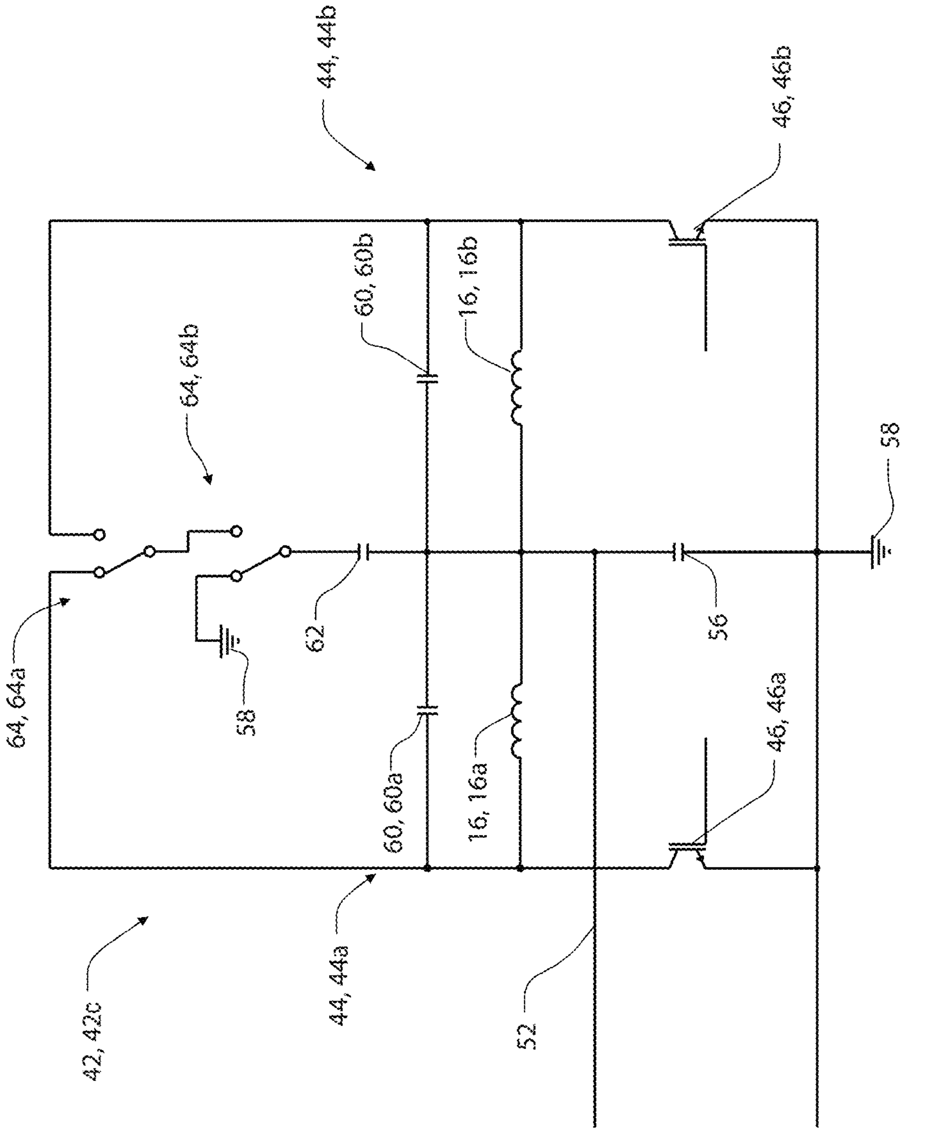
FIG. 4 is a schematic representation of an exemplary embodiment of a driving circuit for an induction cooking system.

Referring now to FIGS. 2-4, a schematic view of a driving circuit 42 is shown. In order to identify specific exemplary aspects of the driving circuits 42, the various embodiments of the driving circuits 42 are referred to as a first driving circuit 42*a* demonstrated in FIG. 2, a second driving circuit 42*b* demonstrated in FIG. 3, and a third driving circuit 42*c* demonstrated in FIG. 4. For common elements, each of the specific exemplary embodiments may be referred to as the driving circuit 42. Though specific features are discussed in reference to each of the first, second, and third driving circuits, each of the embodiments may be modified based on the combined teachings of the disclosure without departing from the spirit of the disclosure.

The driving circuit 42 comprises a plurality of inverters 44 configured to supply driving current to a first induction coil 16*a* and a second induction coil 16*b*. The inverters 44 may correspond to resonant or QR inverters and each may comprise a switching device 46 (e.g. a first switching device 46*a* and a second switching device 46*b*). The switching devices 46 may correspond to solid state power switching devices, which may be implemented as an insulated-gate bipolar transistor (IGBT). The switching devices 46 may be supplied power via a direct current (DC) power supply 48 and may be controlled via a control signal supplied by the controller 20. In this configuration, the controller 20 may selectively activate the induction coils 16 by controlling a switching frequency supplied to the switching devices 46 to generate the electromagnetic field utilized to heat the pan 24. As discussed in the following detailed description, each of the driving circuits 42 may provide for an increased range in a switching frequency ($f_{SW}$) of the plurality of inverters 44 to drive the induction coils 16. The induction coils 16 may correspond to independent induction coils or independent pancake coils.

The DC power supply 48 may comprise a bridge rectifier 50 and an input filter 51 configured to supply DC voltage to a DC-bus 52 from an alternating current (AC) power supply 54. In this configuration, the current DC-bus 52 may be conducted to the inverters 44 across a DC-bus capacitor 56 separating the DC-bus 52 from a ground 58 or ground reference node. In this configuration, the DC power supply 48 may be configured to rectify periodic fluctuations in the AC power to supply DC current to the inverters 44. The DC power supply 48 may be commonly implemented in each of the exemplary driving circuits 42 demonstrated in FIG. 2 and is omitted from FIGS. 3 and 4 to more clearly demonstrate the elements of the driving circuits 42.

Still referring to FIGS. 2-4, the first inverter 44*a* and the second inverter 44*b* are in conductive connection with the DC-Bus 52 of the DC power supply 48. The first inverter 44*a* may comprise a first dedicated resonant capacitor 60*a* and the first induction coil 16*a*. The first dedicated resonant capacitor 60*a* may be connected in parallel with the first induction coil 16*a* from the DC-bus 52 to the first switching device 46*a*. The second inverter 44*b* comprises a second dedicated resonant capacitor 60*b* and the second induction coil 16*b*. The second dedicated resonant capacitor 60*b* may be connected in parallel with the second induction coil 16*b* from the DC-bus 52 to the second switching device 46*b*. In an exemplary embodiment, the dedicated resonant capacitors 60 are dimensioned to establish the resonance in a desired frequency range in conjunction with a third resonant capacitor that may be selectively connected in parallel with either the first dedicated resonant capacitor 60*a* or the second dedicated resonant capacitor 60*b*. The third resonant capacitor may be referred to herein as a tuning capacitor 62. Examples of frequency ranges for operation of the inverters 44 are discussed further in reference to FIGS. 5 and 6.

The tuning capacitor 62 may be selectively connectable in parallel with either the first dedicated resonant capacitor 60*a* or the second dedicated resonant capacitor 60*b* via a two-way switch 64. For example, the controller 20 of the cooktop 10 may be configured to control the switch 64 to a first switch configuration conductively connecting the tuning capacitor 62 in parallel with the first dedicated resonant capacitor 60*a* and the first induction coil 16*a*. The first switch configuration as discussed herein is demonstrated in FIG. 2. The controller 20 may further be configured to control the switch 64 to a second switch configuration conductively connecting the tuning capacitor 62 in parallel with the second dedicated resonant capacitor 60*b* and the second induction coil 16*b*. In this way, the driving circuit 42*a* may be operable to selectively shift the operating frequency range supplied to a load of the first induction coil 16*a* or the second induction coil 16*b*.

Referring now to FIG. 3, in some embodiments, the driving circuit 42*b* may comprise a second switch or a relay switch 72. The relay switch 72 may be configured to selectively disconnect the tuning capacitor 62 from the inverters 44. In this configuration, the controller 20 may be configured to control the two-way switch 64 and the relay switch 72. Accordingly, the controller 20 may be configured to control the two-way switch 64 to a first switch configuration conductively connecting the tuning capacitor 62 in parallel with the first dedicated resonant capacitor 60*a* and the first induction coil 16*a*. The controller 20 may further be operable to control the two-way switch 64 to a second switch configuration conductively connecting the tuning capacitor 62 in parallel with the second dedicated resonant capacitor 60*b* and the second induction coil 16*b*. Finally, the controller 20 may control the relay switch 72 to selectively disconnect the tuning capacitor 62 from both of the first inverter 44*a* and the second inverter 44*b*.

Referring now to FIG. 4, in yet another embodiment, the driving circuit 42*c* may comprise a first two-way switch 64*a* and a second two-way switch 64*b*. The controller 20 may control the first two-way switch 64*a* to selectively shift the operating frequency of the first inverter 44*a* and the second inverter 44*b* as discussed in reference to FIGS. 2 and 3. Additionally, the second two-way switch 64*b* may be connected between the tuning capacitor 62 and the first two-way switch 64*a*. The second two-way switch 64*b* may be configured to selectively connect the tuning capacitor 62 to the first two-way switch 64*a* in a first switching configuration. Additionally, the second two-way switch 64*b* may be configured to selectively connect the tuning capacitor 62 to the ground 58 in parallel with the DC-bus capacitor 56 in a second switching configuration.

In operation, the controller 20 may control the second two-way switch 64*b* to selectively connect the tuning capacitor 62 to the first two-way switch 64*a* in the first switch configuration. Additionally, the controller 20 may control the second two-way switch 64*b* to selectively connect the tuning capacitor 62 to the ground 58. By connecting the tuning capacitor 62 to the ground 58 in parallel with the DC-bus capacitor 56, the controller 20 may limit electromagnetic interference (EMI). Accordingly, the various configurations of the driving circuits 42 may provide for improved operation of the induction cooktop 10.

Figure 5:
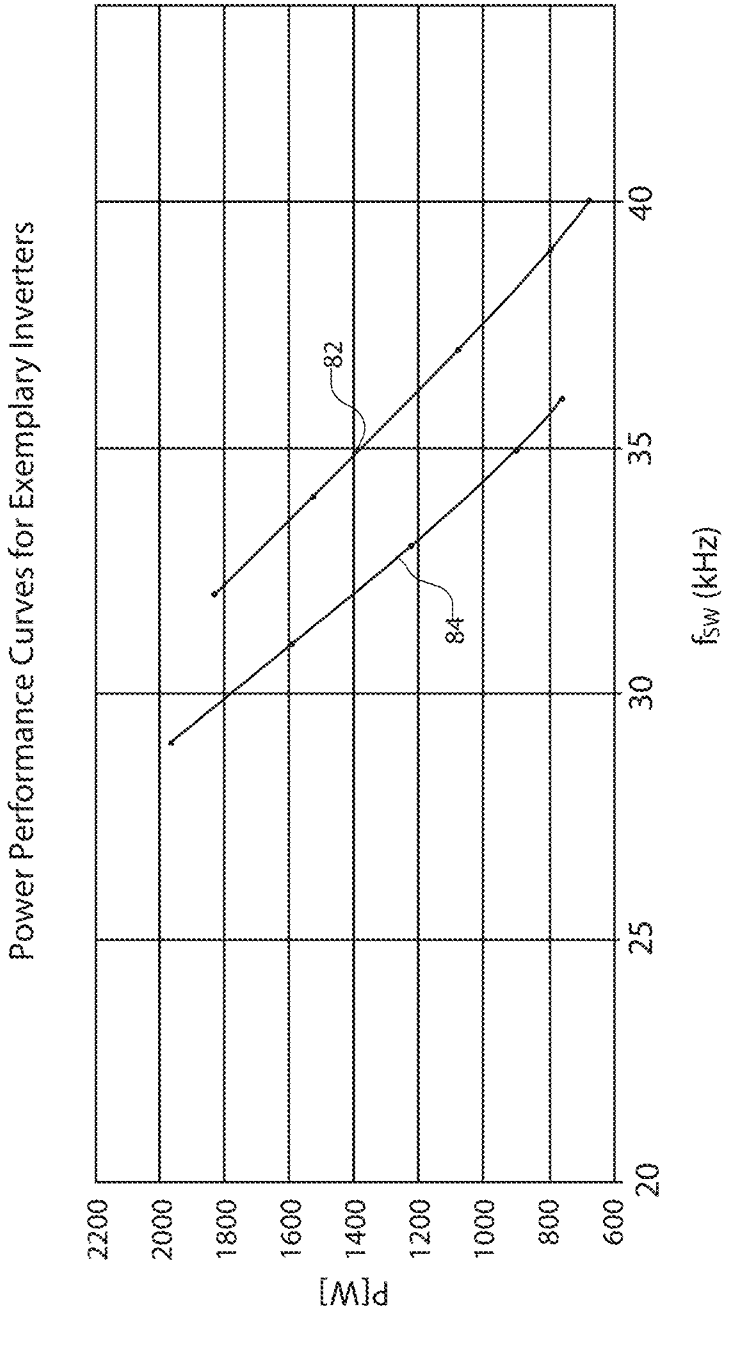
FIG. 5 is a plot of a system response of an exemplary embodiment of an inverter.

Referring now to FIG. 5, a plot of power generated by an exemplary embodiment of the inverter 44 is shown. The plot demonstrates the performance of the inverter 44 with two different values of the dedicated resonant capacitor 60 and similar loads (e.g. the pan 24). The plot demonstrates the power generated by two different exemplary inverter configurations to a range of switching frequencies ($f_{SW}$). For example, the power output range of the inverter 44 is shown over a first operating range 82 for the dedicated resonant capacitor 60 having a capacitance of 270 nF. For comparison, the power output range of the inverter 44 is shown over a second operating range 84 for the dedicated resonant capacitor 60 having a capacitance of 330 nF.

As demonstrated in FIG. 5, the first operating range 82 corresponds to a comparatively lower capacitance and varies from a power output of 674 W at a switching frequency ($f_{SW}$) of 40 kHz to 1831 W at $f_{SW}$=32 kHz. The second operating range 84 corresponds to a comparatively higher capacitance and varies from a power output of 758 W at $f_{SW}$=36 kHz to 1964 W at $f_{SW}$=29 kHz. Accordingly, increasing the capacitance of the dedicated resonant capacitor 60 of the inverter 44 may provide for a shift lower than the operating range of the switch frequency ($f_{SW}$) while increasing the power output. These principles may similarly be applied to adjust the operating range and power output of the exemplary inverters 44 of the driving circuits 42 by adjusting the effective capacitance with the tuning capacitor 62 to suit a desired mode of operation.

Figure 6:
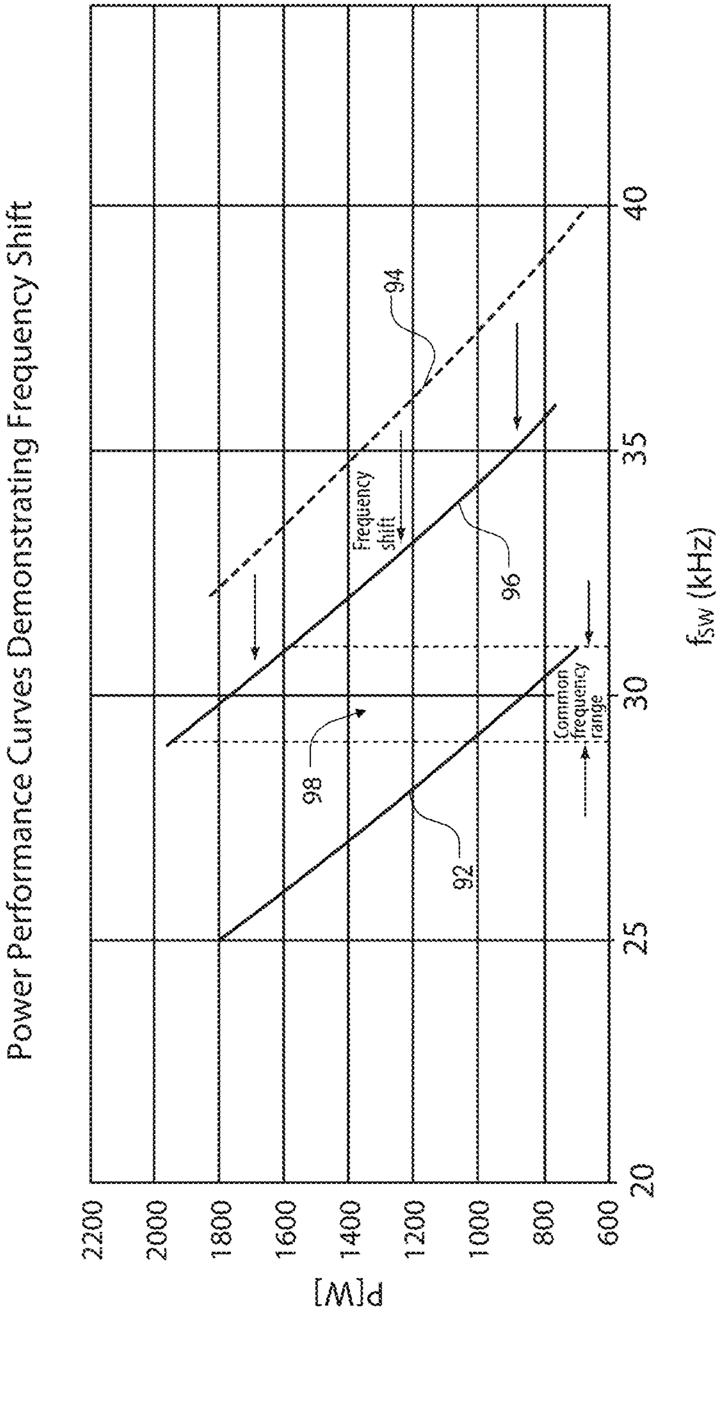
FIG. 6 is a plot of power generated by two different resonant capacitors over a range of switching frequencies demonstrating a shift in an operating frequency.

Referring now to FIG. 6, a system response of the driving circuit 42 resulting from a frequency shift caused by adding the tuning capacitor 62 is shown. As previously discussed, the controller 20 may selectively connect the tuning capacitor 62 in parallel to either the first inverter 44*a* or the second inverter 44*b*. As previously discussed, the tuning capacitor 62 may be added in parallel to either the first dedicated resonant capacitor 60*a* or the second dedicated resonant capacitor 60*b* by the controller 20. Depending on the particular embodiment or the driving circuit 42, the controller 20 may add the tuning capacitor 62 in parallel by controlling the first two-way switch 64*a* in combination with either the second two-way switch 64*b* or the relay switch 72. Accordingly, the controller 20 may be configured to selectively adjust an operating frequency range of either the first inverter 44*a* or the second inverter 44*b*.

In operation, the operating frequency of each of the inverters may not only differ based on the design of the inverters 44 but also in response to load changes or differences in the diameter, magnetic permeability and conductivity of the conductive ferromagnetic material of the pans or cooking accessories on the cooktop 10. In the exemplary embodiment shown in FIG. 6, each of the first inverter 44*a* and the second inverter 44*b* comprises a dedicated resonant capacitor 60 of 270 nF. However, due to differences in load on each of the induction coils 16 and other variables, the operating ranges differ significantly. For example, in the exemplary embodiment, the first inverter 44*a* has a first operating range 92 that varies from 710 W at $f_{SW}$=30.8 kHz to 1800 W at $f_{SW}$=25 kHz. The second inverter 44*b* has a second operating range 94 that varies from 670 W at $f_{SW}$=40 kHz to 1825 W at $f_{SW}$=32.3 kHz. Note that neither the first operating range 92 nor the second operating range 94 provide for soft-switching operation between 30.8 kHz and 32.3 kHz and do not overlap in the operating range of the switching frequency ($f_{SW}$).

During operation it may be advantageous to limit intermodulation acoustic noise. However, as demonstrated, the first operating range 92 and the second operating range 94 do not have an overlapping range of operation in the soft-switching region. However, by adjusting the effective capacitance of the second dedicated resonant capacitor 60*b* by adding the tuning capacitor 62 in parallel, the second operating range 94 is shifted to an adjusted operating range 96. Though discussed in reference to shifting the second operating range 94 of the second inverter 44*b*, the controller 20 may be configured to similarly shift the first operating range 92 of the first inverter 44*a*. In general, the controller 20 may identify the higher operating range of the switch frequency ($f_{SW}$) of the first inverter 44*a* and the second inverter 44*b* and control at least one of the switches (e.g. 64*a*, 64*b*, and 72) to apply the tuning capacitor 62 in parallel with the corresponding dedicated resonant capacitor (e.g. 60*a* or 60*b*). In this way, the controller 20 may shift the operating range of the first inverter to at least partially overlap with the operating range of the second inverter.

Still referring to FIG. 6, the adjusted operating range 96 varies from approximately 750 W at 36 kHz to 1960 W at 29 kHz. Accordingly, the first operating range 92 of the first inverter 44*a* and the adjusted operating range 96 of the second inverter 44*b* may provide for a common frequency range 98. In this configuration, the controller 20 may control each of the inverters 44 with the same switching frequency within the common frequency range 98 to achieve simultaneous operation while limiting acoustic noise. The effects of applying the tuning capacitor 62 to the inverters 44 are summarized in Table 1.

TABLE 1

Performance changes resulting from applying tuning capacitor 62

| Switch Configuration | Frequency Range | Pmax | Pmin |
|---|---|---|---|
| Dedicated Resonant Capacitor | Shift Upward (increase) | Decrease | Decrease |
| Dedicated Resonant Capacitor with Tuning Capacitor | Shift Downward (decrease) | Increase | Increase |

From Table 1, the performance changes of the inverter 44 with and without the tuning capacitor 62 are summarized. In response to the tuning capacitor 62 being added in parallel with the dedicated resonant capacitor 60, the range of the switching frequency ($f_{SW}$) is shifted downward or decreased. Additionally, the maximum power ($P_{max}$) output from the inverter 44 increases and the minimum power ($P_{min}$) increases. In this way, the controller 20 may control at least one of the switches (e.g. 64*a*, 64*b*, and 72) to adjust the operating range of one of the inverters 44. In some cases, the shifting of the operating range may provide for the common frequency range 98 of the inverters 44 to achieve simultaneous operation while limiting acoustic noise.

Accordingly, based on the first operating range 92, the second operating range 94, and the adjusted operating range 96, the controller 20 may be configured to control the inverters 44 to operate within their respective operating ranges. For example, in the case that only one of the two inverters 44 is active, the controller 20 may be configured to connect the tuning capacitor 62 to the corresponding induction coil 16 (e.g. 16*a* or 16*b*). The controller 20 may connect the tuning capacitor 62 via the first two-way switch 64*a* if a set-point power of an operating range (e.g. 92 or 94) exceeds the maximum power deliverable by that inverter (44*a* or 44*b*) with only the dedicated resonant capacitor (60*a* or 60*b*). Otherwise, when the set-point power of the inverters 44 are within the operating ranges (92 or 94), the controller 20 may disconnect the tuning capacitor 62 by controlling the second two-way switch 64*b* or the relay switch 72.

In the case where both inverters 44 are required to deliver power simultaneously, the controller 20 may connect the tuning capacitor 62 to one of the induction coils 16 such that the first inverter 44*a* and the second inverter 44*b* have the common operating frequency range 98. For example, the controller 20 may connect the tuning capacitor 62 in parallel with the second inverter 44*b*. Accordingly, the first operating range 92 of the first inverter 44*a* and the adjusted operating range 96 of the second inverter 44*b* may provide for the common frequency range 98. In this configuration, the controller 20 may control each of the inverters 44 with the same switching frequency within the common frequency range 98 to achieve simultaneous operation while limiting acoustic noise. Finally, in the case where both inverters 44 are required to deliver power simultaneously and the operating frequency ranges 92 and 94 already include an overlapping frequency range, the controller 20 may disconnect the tuning capacitor 62 by controlling the second two-way switch 64*b* or the relay switch 72.

Figure 7:
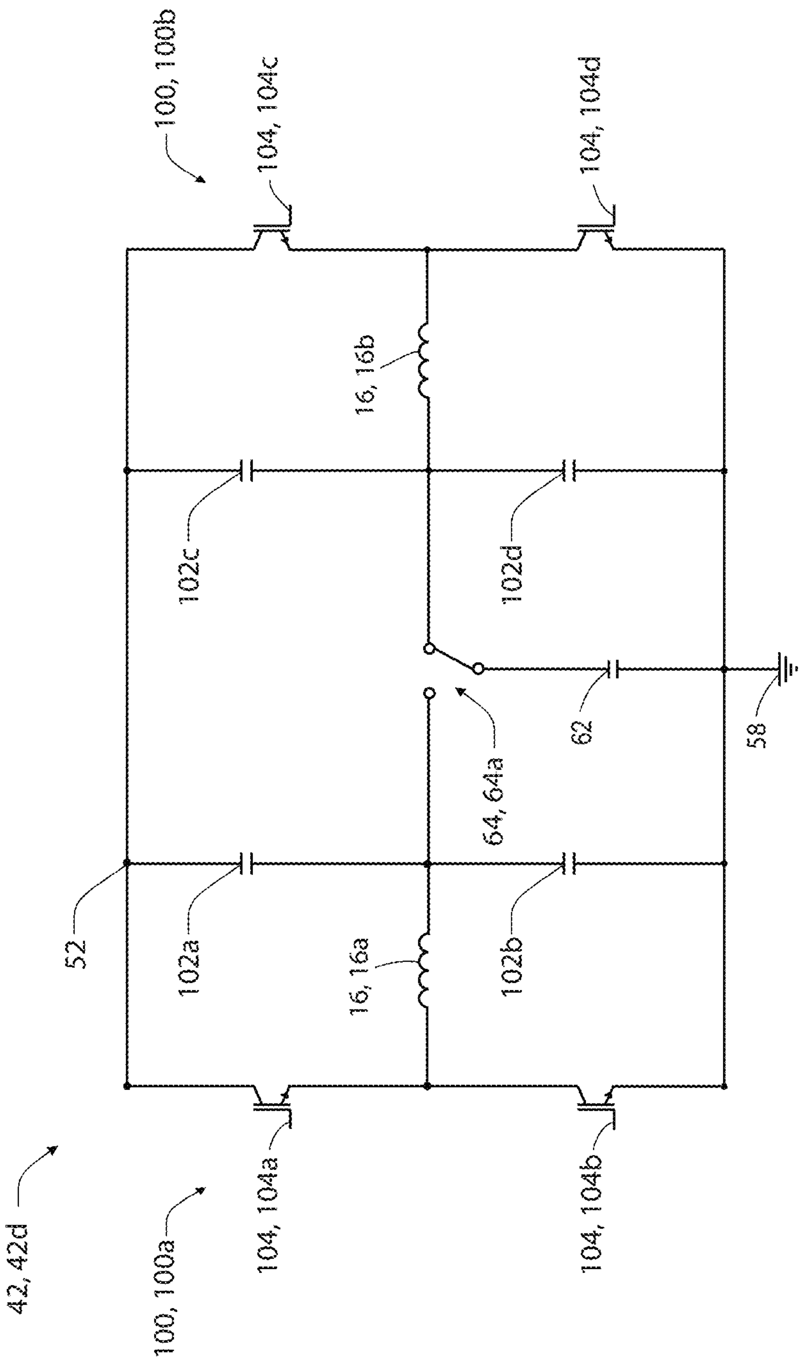
FIG. 7 is a schematic representation of an exemplary embodiment of a driving circuit for an induction cooking system in accordance with the disclosure.

Referring now to FIG. 7, a diagram of yet another embodiment of a driving circuit 42, 42*d* for a cooktop 10 is shown. The driving circuit 42*d* may comprise a plurality of half-bridge, series resonant inverters 100. For example, the driving circuit 42*d* may comprise a first series resonant inverter 100*a* and a second series resonant inverter 100*b*. The first series resonant inverter 100*a* may comprise the first induction coil 16*a* and a plurality of dedicated resonant capacitors 102*a* and 102*b*. Additionally, the first series resonant inverter 100*a* may comprise a plurality of switching devices 104 (e.g. a first switching device 104*a* and a second switching device 104*b*). The first switching device 104*a* may be connected from the DC-bus 52 to a first side of the first induction coil 16*a*. The second switching device 104*b* may be connected from the ground 58 to the first side of the first induction coil 16*a*. A first dedicated capacitor 102*a* may be connected from the DC-bus 52 to a second side of the first induction coil 16*a*. Additionally, a second dedicated capacitor 102*b* may be connected from the ground 58 to the second side of the first induction coil 16*a*.

The second series resonant inverter 100*b* may comprise the second induction coil 16*b* and a plurality of dedicated resonant capacitors 102*c* and 102*d*. The second series resonant inverter 100*b* may further comprise a plurality of switching devices 104 (e.g. a third switching device 104*c* and a fourth switching device 104*d*). The third switching device 104*c* may be connected from the DC-bus 52 to a first side of the second induction coil 16*b*. The fourth switching device 104*d* may be connected from the ground 58 to the first side of the second induction coil 16*b*. A third dedicated capacitor 102*c* may be connected from the DC-bus 52 to a second side of the second induction coil 16*b*. Additionally, a fourth dedicated capacitor 102*d* may be connected from the ground 58 to the second side of the second induction coil 16*b*.

The switching devices 104 may correspond to solid state power switching devices, similar to the switching devices 104, which may be implemented as an insulated-gate bipolar transistor (IGBT). The switching devices 104 may be supplied power via DC-bus 52 of the DC power supply 48 and may be controlled via a control signal supplied by the controller 20. In this configuration, the controller 20 may selectively activate the induction coils 16 by controlling a switching frequency supplied to the switching devices 104 to generate the electromagnetic field utilized to heat the pan 24.

The tuning capacitor 62 may be selectively connected to the second side of the first induction coil 16*a* or connected to the second side of the second induction coil 16*b* by the two-way switch 64. For example, in a first configuration, the switch 64 may connect the tuning capacitor 62 in parallel with the second dedicated capacitor 102*b*. In a second configuration, the switch 64 may connect the tuning capacitor 62 in parallel with the fourth dedicated capacitor 102*d*. Accordingly, the driving circuit 42*d* may be operable to selectively shift the operating frequency range supplied to a load of the first induction coil 16*a* or the second induction coil 16*b* by controlling the switch 64.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for controlling an induction heating system, the method comprising:

generating a direct current (DC) power from an alternating current (AC) power source;

supplying the DC power to a first resonant inverter and a second resonant inverter via a power supply bus;

controlling a switching frequency of each of the first resonant inverter and the second resonant inverter;

generating an electromagnetic field in response to the switching frequency supplied to a plurality of induction coils of the resonant inverters; and selectively tuning the operation of either the first resonant inverter or the second resonant inverter by controlling a connection of a capacitor to either the first resonant inverter or the second resonant inverter, wherein selectively tuning the operation of either the first resonant inverter or the second resonant inverter comprises shifting either a first operating frequency range of the first resonant inverter or a second operating frequency range of the second resonant inverter.

2. The method according to claim 1, wherein shifting the operating frequency range comprises adjusting either the first operating frequency range or the second operating frequency range such that the first operating frequency range and the second operating frequency range include a range of common operating frequencies.

3. The method according to claim 1, wherein selectively tuning the operation of the first resonant inverter comprises:

receiving a set-point power for the first resonant inverter; and comparing a switching frequency for the set-point power to the first operating frequency range.

4. The method according to claim 3, wherein in response to the set-point power requiring a switching frequency outside the first operating frequency range, connecting the capacitor to the first resonant inverter.

5. The method according to claim 4, wherein connecting the capacitor to the first resonant inverter adjusts the first operating frequency range to an adjusted operating frequency range including the switching frequency.

6. The method according to claim 1, wherein selectively tuning the operation of either the first resonant inverter or the second resonant inverter comprises connecting either the first resonant inverter or the second resonant inverter in parallel to a tuning capacitor.

7. The method according to claim 6, further comprising:

selectively disconnecting the tuning capacitor from both of the first resonant inverter and the second resonant inverter.

8. The method according to claim 7, further comprising:

connecting the tuning capacitor in parallel with a bus capacitor in response to selectively disconnecting the tuning capacitor from both of the first resonant inverter and the second resonant inverter.

9. An induction cooking system, comprising:

a power supply bus configured to generate direct current (DC) power;

a first resonant inverter and a second resonant inverter in connection with the power supply bus;

a plurality of induction coils configured to generate an electromagnetic field in connection with the plurality of resonant inverters;

at least one switch configured to control a connection of a tuning capacitor with either the first resonant inverter or the second resonant inverter; and at least one controller configured to:

control a switching frequency of each of the first resonant inverter and the second resonant inverter supplied to the plurality of induction coils of the resonant inverters, wherein the switching frequency controls the electromagnetic field; and control the connection of the tuning capacitor with either the first resonant inverter or the second resonant inverter via the at least one switch, wherein the connection of the tuning capacitor adjusts an operating frequency range of the first inverter or the second inverter, wherein the connection of the tuning capacitor with either the first dedicated capacitor or the second dedicated capacitor adjusts a corresponding operating frequency range of the first resonant inverter or the second resonant inverter.

10. The induction cooking system according to claim 9, wherein the plurality of induction coils comprises a first induction coil in connection with the first resonant inverter and a second induction coil in connection with the second resonant inverter.

11. The induction cooking system according to claim 10, wherein the connection of the tuning capacitor is controlled in a parallel with either the first induction coil in response to a first position of the switch or the second induction coil in response to a second position of the switch.

12. The induction cooking system according to claim 10, wherein the first resonant inverter comprises a first dedicated capacitor connected in parallel with the first inductor and the second resonant inverter comprises a second dedicated capacitor connected in parallel with the second inductor.

13. The induction cooking system according to claim 12, wherein the at least one switch is conductively connected to the tuning capacitor and configured to selectively connect to each of the dedicated resonant capacitors of the resonant inverters.

14. The induction cooking system according to claim 9, wherein the connection of the tuning capacitor with either the first resonant inverter or the second resonant inverter comprises shifting either a first operating frequency range of the first resonant inverter or a second operating frequency range of the second resonant inverter.

15. The induction cooking system according to claim 14, wherein shifting the operating frequency range comprises adjusting either the first operating frequency range or the second operating frequency range such that the first operating frequency range and the second operating frequency range include a range of common operating frequencies.

16. The induction cooking system according to claim 9, wherein the at least one switch is further configured to:

disconnect the tuning capacitor from both of the first resonant inverter and the second resonant inverter.

17. The induction cooking system according to claim 16, where the tuning capacitor is connected in parallel with a bus capacitor of the power supply bus in response to the disconnection from both the first resonant inverter and the second resonant inverter, wherein the bus capacitor separates the power supply bus from a ground or reference node.

18. A method for controlling an induction heating system, the method comprising:

generating a direct current (DC) power from an alternating current (AC) power source;

supplying the DC power to a first resonant inverter and a second resonant inverter via a power supply bus;

controlling a switching frequency of each of the first resonant inverter and the second resonant inverter;

generating an electromagnetic field in response to the switching frequency supplied to a plurality of induction coils of the resonant inverters; and selectively tuning the operation of either the first resonant inverter or the second resonant inverter by controlling a connection of a tuning capacitor to either the first resonant inverter or the second resonant inverter, wherein selectively tuning the operation comprises:

connecting the tuning capacitor in parallel with a first dedicated capacitor of the first resonant inverter in a first configuration; and alternatively connecting the tuning capacitor in parallel with a second dedicated capacitor of the second resonant inverter in a second configuration, wherein the connection of the tuning capacitor with either the first dedicated capacitor or the second dedicated capacitor adjusts a corresponding operating frequency range of the first resonant inverter or the second resonant inverter.

* * * * *